(12) United States Patent
Buchmann

(10) Patent No.: US 12,006,142 B2
(45) Date of Patent: Jun. 11, 2024

(54) MODULAR STORAGE AND ORDER PICKING SYSTEM

(71) Applicant: Rainer Buchmann, Grosswallstadt (DE)

(72) Inventor: Rainer Buchmann, Grosswallstadt (DE)

(73) Assignee: STOW ROBOTICS GMBH, Grosswallstadt (DE)

( * ) Notice: Subject to any disclaimer, the term of this patent is extended or adjusted under 35 U.S.C. 154(b) by 239 days.

(21) Appl. No.: 16/770,309

(22) PCT Filed: Dec. 3, 2018

(86) PCT No.: PCT/EP2018/083260
§ 371 (c)(1),
(2) Date: Jun. 5, 2020

(87) PCT Pub. No.: WO2019/110461
PCT Pub. Date: Jun. 13, 2019

(65) Prior Publication Data
US 2021/0171285 A1    Jun. 10, 2021

(30) Foreign Application Priority Data
Dec. 7, 2017 (DE) ...................... 10 2017 129 120.2

(51) Int. Cl.
*B65G 1/02* (2006.01)
*B65G 1/04* (2006.01)
(Continued)

(52) U.S. Cl.
CPC ............... *B65G 1/026* (2013.01); *B65G 1/02* (2013.01); *B65G 1/0407* (2013.01); *B65G 1/06* (2013.01);
(Continued)

(58) Field of Classification Search
CPC ...... B65G 1/0407; B65G 1/1378; B65G 1/08; B65G 1/1371; B65G 2207/30; B65G 1/02;
(Continued)

(56) References Cited

U.S. PATENT DOCUMENTS

| 4,418,757 A | * | 12/1983 | Merkel | ................ | A62C 35/58 |
| | | | | | 285/64 |
| 4,891,919 A | * | 1/1990 | Palibroda | ............ | E04B 1/34321 |
| | | | | | 52/79.5 |
| 5,314,078 A | * | 5/1994 | Morikiyo | ................ | A47F 1/087 |
| | | | | | 221/196 |

(Continued)

FOREIGN PATENT DOCUMENTS

| DE | 10019632 A1 | 10/2001 |
| DE | 102014104470 A1 | 10/2015 |

(Continued)

OTHER PUBLICATIONS

International Search Report and Written Opinion dated Mar. 21, 2019 in International (PCT) Application No. PCT/EP2018/083260, English translation of ISR only.

*Primary Examiner* — Thomas Randazzo
(74) *Attorney, Agent, or Firm* — McDermott Will & Emery LLP

(57) ABSTRACT

The invention relates to a storage and order picking system with a storage unit, comprising a plurality of through-flow channels for receiving storage containers for storing articles, an order picking unit having one or more dispensing areas for removing articles and one or more target areas for the order-related or partially order-related collection of articles, a conveyor unit for conveying storage containers between the storage unit and the order picking unit, wherein the storage unit has a self-supporting frame structure on which the order picking unit and the conveyor unit are attached (Continued)

such that they are detachably connected to one another. The modular storage and order picking system is built, brought into service and tested preferably in an installation location, then modularly dismantled and brought to an application location, where it is then brought into service by assembling the modules. A bringing into service and test phase in the application location can be forgone due to the above-mentioned test phase, so that the system is functional and ready for operation within a few hours. In addition, the modular structure of the storage and order picking system according to the invention permits the units—storage unit, order picking unit and conveyor unit—to be transported separately and then to be assembled in the application location.

12 Claims, 5 Drawing Sheets

(51) Int. Cl.
  *B65G 1/06* (2006.01)
  *B65G 1/08* (2006.01)
  *B65G 1/137* (2006.01)
  *E04B 1/343* (2006.01)
(52) U.S. Cl.
  CPC .............. *B65G 1/08* (2013.01); *B65G 1/137* (2013.01); *B65G 1/1371* (2013.01); *B65G 1/1378* (2013.01); *B65G 2207/30* (2013.01); *E04B 1/34317* (2023.08)
(58) Field of Classification Search
  CPC ............ B65G 2201/0258; B65G 1/026; B65G 1/06; H02M 1/36; H02M 3/33584; H02M 1/40; E04B 1/34317
  See application file for complete search history.

(56) References Cited

U.S. PATENT DOCUMENTS

| | | | | |
|---|---|---|---|---|
| 5,328,038 | A * | 7/1994 | Allen | B65G 1/06 211/151 |
| 5,403,055 | A * | 4/1995 | Allison | B66C 1/10 294/67.1 |
| 5,447,000 | A * | 9/1995 | Larsen | E04B 1/34315 52/234 |
| 5,966,956 | A * | 10/1999 | Morris | E04B 1/3444 52/79.5 |
| 5,992,651 | A * | 11/1999 | Shaw | A47F 5/13 211/59.2 |
| 9,526,333 | B1 * | 12/2016 | Nielson | A47B 87/0292 |
| 2004/0143363 | A1 * | 7/2004 | Hoogland | B65G 1/06 700/213 |
| 2005/0132718 | A1 * | 6/2005 | Lilke | F25D 11/02 62/3.6 |
| 2008/0131241 | A1 | 6/2008 | King | |
| 2009/0223144 | A1 * | 9/2009 | Leahy | E04B 1/34321 52/745.02 |
| 2010/0307989 | A1 * | 12/2010 | Hanel | B65G 1/0407 211/79 |
| 2013/0149080 | A1 * | 6/2013 | Martin De Pablo | B65G 1/06 414/281 |
| 2013/0291449 | A1 * | 11/2013 | Strickland | E04B 1/3442 52/79.5 |
| 2015/0251850 | A1 * | 9/2015 | Mathi | B65G 1/1373 414/807 |
| 2017/0036859 | A1 * | 2/2017 | Lopes Ribeiro | B65G 1/137 |
| 2017/0327312 | A1 * | 11/2017 | Hoehler | G06Q 10/08 |
| 2019/0168392 | A1 * | 6/2019 | Väin | B65G 1/0407 |

FOREIGN PATENT DOCUMENTS

| | | |
|---|---|---|
| DE | 102016102262 A1 | 8/2017 |
| DE | 102017112305 A1 | 7/2018 |
| EP | 1005432 A1 | 6/2000 |
| WO | 2015144139 A1 | 10/2015 |
| WO | 2018220095 A1 | 12/2018 |

* cited by examiner

MODULAR STORAGE AND ORDER PICKING SYSTEM

RELATED APPLICATIONS

This application is a United States National Phase under 35 U.S.C. § 371 of International Application No. PCT/EP2018/083260, filed on Dec. 3, 2018, which claims priority to German Patent Application No. 10 2017 129 120.2, filed Dec. 7, 2017, both of which are hereby incorporated by reference in their entirety for all purposes.

FIELD OF THE INVENTION

The invention relates to a modularly constructed storage and order picking system for articles stored in containers, and to a method for constructing and commissioning said system.

BACKGROUND OF THE INVENTION

For Internet-based mail-order businesses (e-commerce), flexible, fast and reliable logistics are essential. Said logistics include storage and order picking systems which collate the individual customer orders, package them, and prepare them for dispatch.

The need for storage and order picking capacity may change at short notice, for example when a start-up company rapidly "scales up", when a new market is to be captured, or when a peak in demand (such as Christmas trade) has to be processed. There is therefore a need for storage and order picking systems which can quickly and flexibly be put into operation and can be removed and transferred to a different site within a very short period of time.

The object of the invention is therefore to propose a storage and order picking system for articles stored in containers, which can be installed, put into operation and dismantled again quickly and with little effort and which can also easily be adapted (scaled) to a changing throughput of goods.

SUMMARY OF THE INVENTION

According to the invention, this object is achieved by a modular storage and order picking system comprising a storage unit having a plurality of through-flow channels for receiving storage containers for storing articles, an order picking unit having one or more dispensing spaces for removing articles and one or more target spaces for collating articles relating to an order or partial order, a conveyor unit for conveying storage containers between the storage unit and the order picking unit, wherein the storage unit has a self-supporting frame structure, on which the order picking unit and the conveyor unit are mounted in a manner detachably connected to one another.

The modular storage and order picking system according to the invention is preferably constructed at an installation site, put into operation and tested, then is broken down into transportable modules and brought to a site of use and erected there ready for use without any further commissioning activities. A relatively long test phase can be omitted due to the test phase at the installation site, and therefore the facility is functional and ready to operate within a few hours. The modular construction of the storage and order picking system according to the invention enables the units, namely the storage unit, the order picking unit and the conveyor unit, to be transported separately and then assembled at the site of use.

Preferably, the storage and order picking system is not permanently connected to the floor or to a building, wherein the self-supporting frame structure stands on the floor and the through-flow channels, the order picking unit and the conveyor unit are connected thereto.

Preferably, the storage unit, the order picking unit and the conveyor unit are functionally connected to one another by means of detachable mechanical and electrical plug-in connections. This enables quick and safe assembly and disassembly of the facility.

The frame structure may be configured with dimensions corresponding to the internal dimensions of a standard container or to the maximum dimensions of a semi-trailer, thereby facilitating transportation of the facility. The storage unit may preferably be shaped as a cuboid with the self-supporting frame structure on the outside, said self-supporting frame structure being formed by suspended flat bar.

Preferably, the through-flow channels are arranged one above the other transversely to the longitudinal direction of the storage unit and in a manner inclined relative to the horizontal, as a result of which the containers located in the storage channels can easily be removed. The through-flow channels may be arranged in groups or stacks inclined in opposite directions.

Preferably, the conveyor unit has conveyor means extending on both sides along the longitudinal axis of the storage unit. This enables the containers to be stored in the through-flow channels of the storage unit and retrieved therefrom in a quick and efficient manner. The conveyor means may be held by add-on frames which can be detachably connected to the frame structure.

Preferably, the order picking unit is arranged on one or both end faces of the storage unit and may be configured as a manual, partially automated or fully automated order picking unit.

The order picking unit may have buffer spaces above or below the target spaces, said buffer spaces being served by the conveyor means.

Preferably, the order picking unit has an inventory management computer which records the position of the storage containers in the storage unit and enables direct access to individual storage containers. In addition, optical display means for displaying the quantity and target container of the article(s) to be picked may be provided for the order picker.

The conveyor means may be configured as rail-guided conveyor devices for storing the storage containers in the through-flow channels of the storage unit and retrieving them therefrom in an automated and computer-controlled manner.

DESCRIPTION OF THE FIGURES

The invention will be described in detail below on the basis of exemplary embodiments and with reference to the drawings, in which.

DETAILED DESCRIPTION OF THE INVENTION

Figure 1:
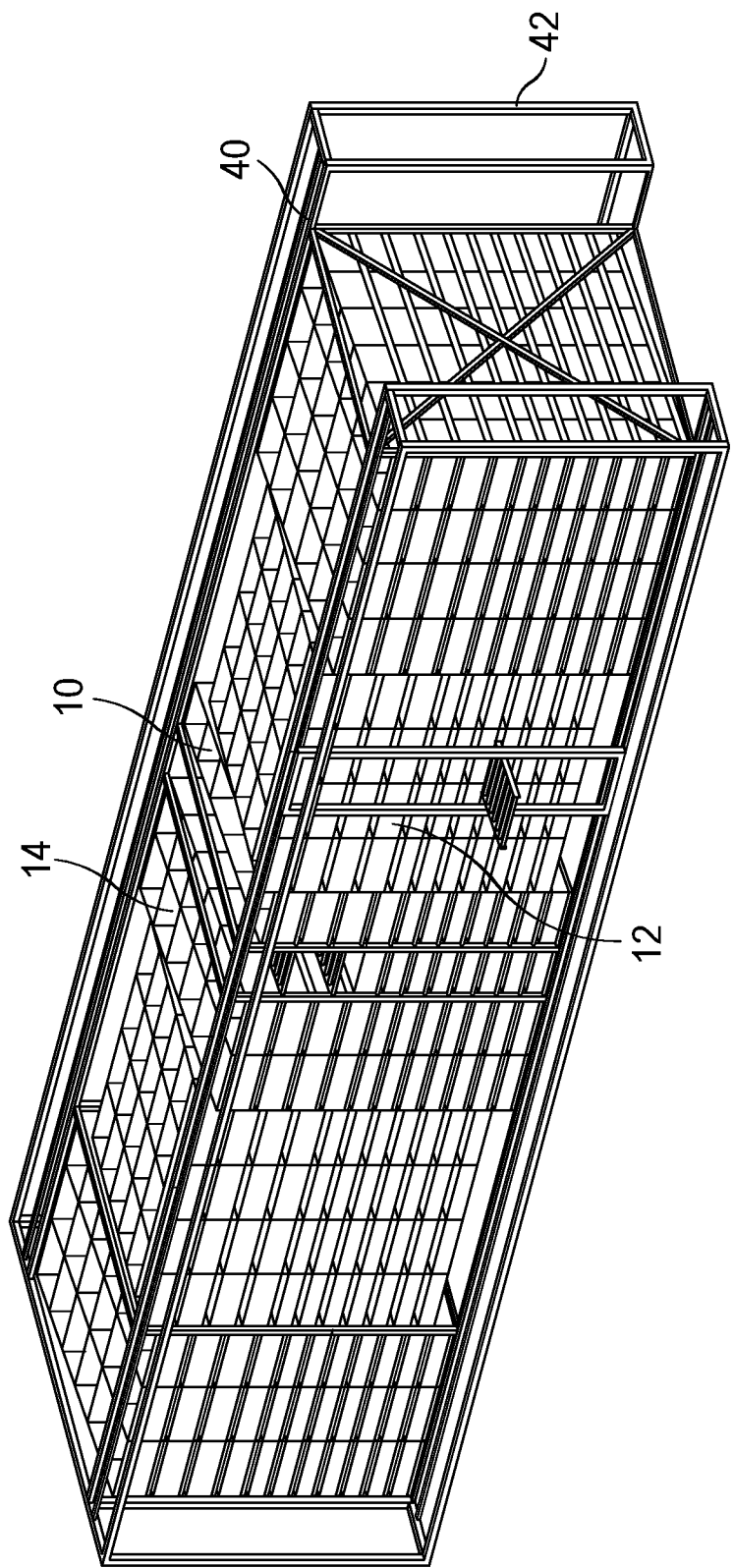
FIG. 1 shows a schematic perspective view of the storage unit and the frame structure of one exemplary embodiment of the modular storage and order picking system according to the invention.

FIG. 1 shows a schematic perspective view of the storage unit 10 and the frame structure 40 of one exemplary embodiment of the modular storage and order picking system 100 according to the invention. Conveyor means can be seen on both long sides. In this illustration, the order picking unit is omitted for reasons of clarity. The frame structure 40 consists of a self-supporting frame made of tubular steel, flat metal or aluminium or another suitable material and has the internal dimensions of a 40-foot container or has dimensions such that it fits on a conventional truck semi-trailer. This enables time-saving loading and unloading from both 40-foot containers and semi-trailers.

Integrated in the frame structure 40 is the elongate storage unit 10, in which through-flow channels 12 for commercially available containers 14 or trays are integrated, it being possible for said through-flow channels to be arranged in groups or columns inclined in opposite directions. The containers 14 may be individually subdivided according to requirements, for example in the form of inserts. It is also possible to design the modules for different container heights.

Figure 4:
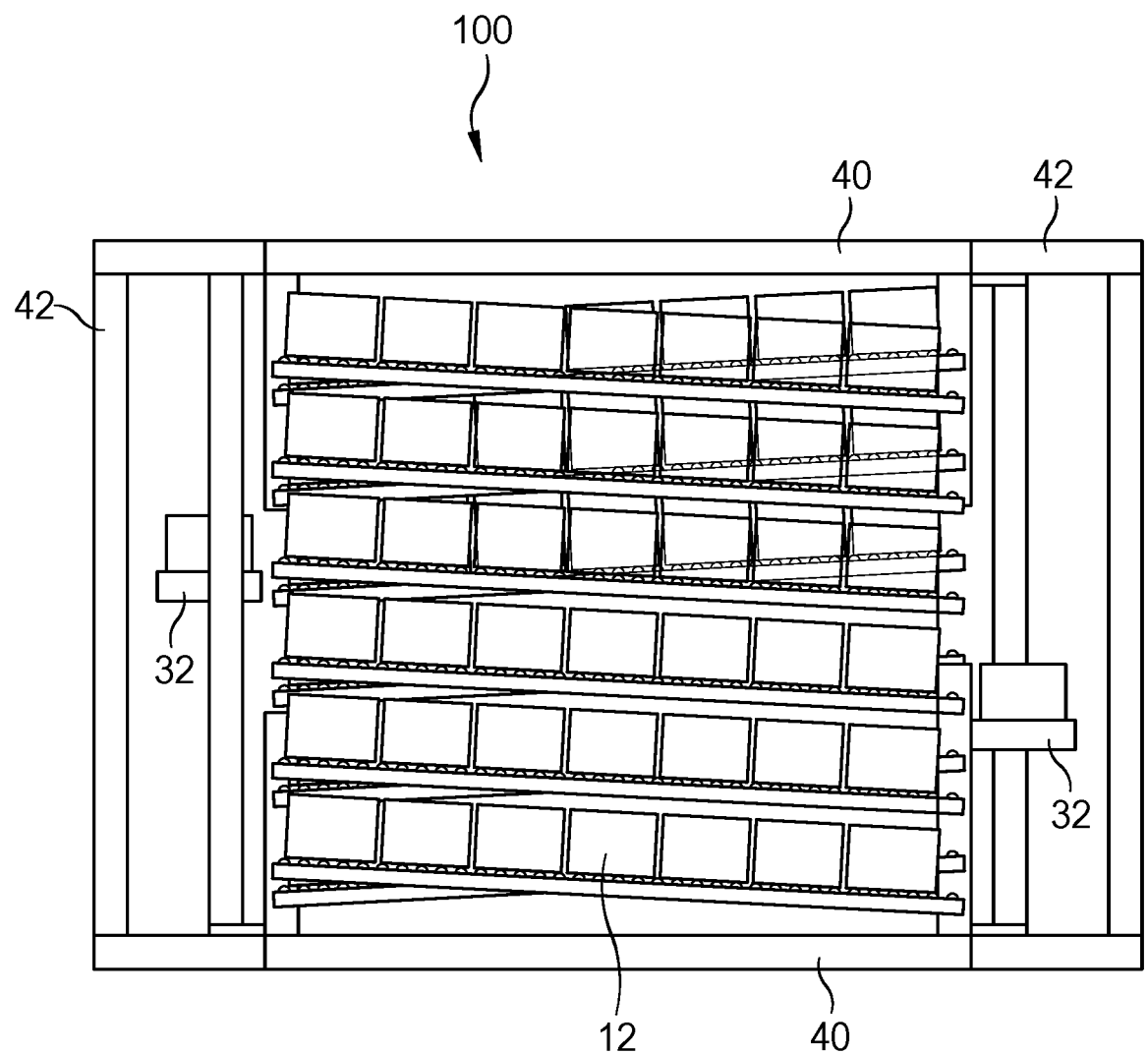
FIG. 4 shows a schematic cross-sectional view of one exemplary embodiment of the modular storage and order picking system according to the invention.

Located on the long sides of the storage unit 10 and of the main frame are rail-guided, fully automatic removal devices 32 which remove containers 14 from the through-flow channels 12 and return them to storage therein (see also FIG. 4). The removal devices 32 have already been put into operation and tested in a second, possibly subdivided frame 42, which is connected to the main frame 40 via conical guide elements and electrical plug-in connections.

Figure 2:
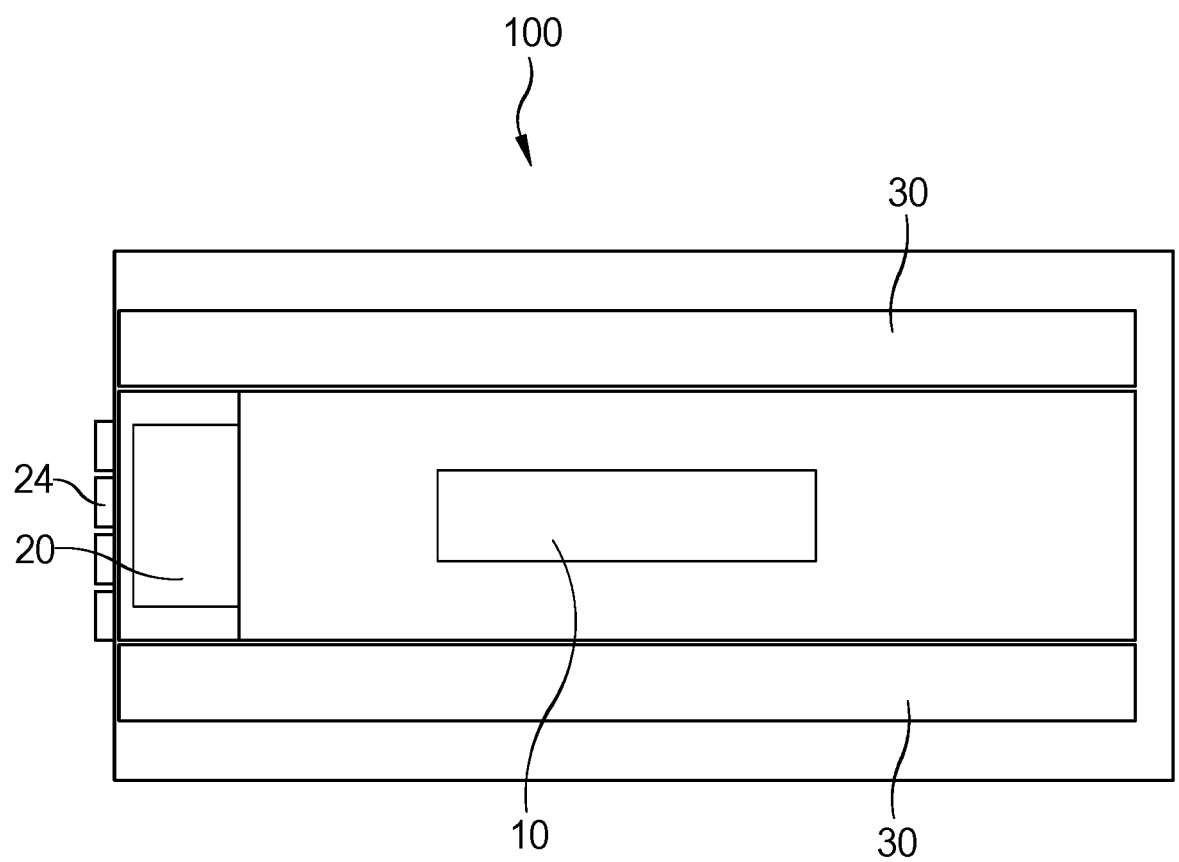
FIG. 2 shows a schematic horizontal sectional view of one exemplary embodiment of the modular storage and order picking system according to the invention.
Figure 3:
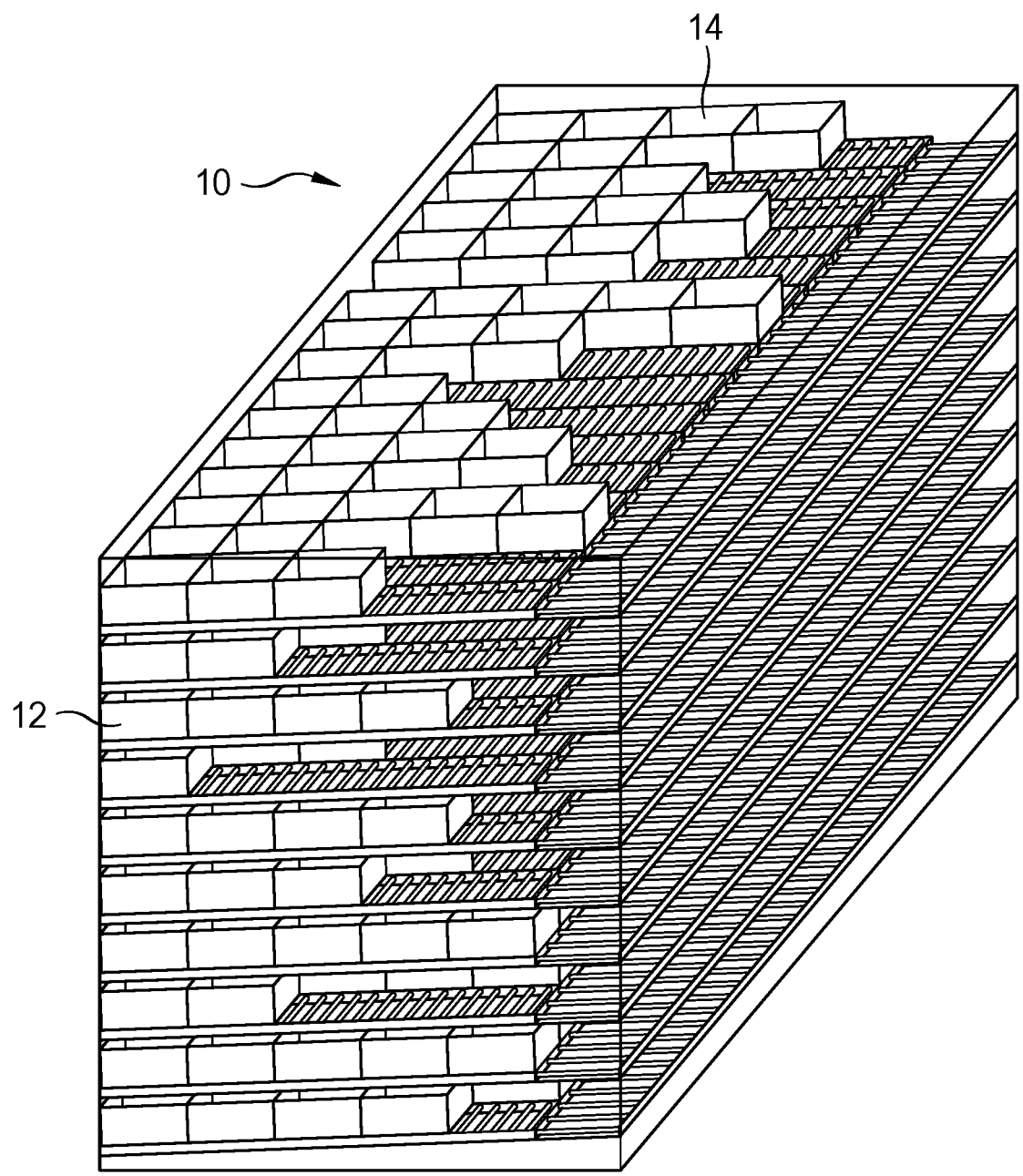
FIG. 3 shows a schematic perspective view of the storage unit of one exemplary embodiment of the modular storage and order picking system according to the invention.

FIG. 2 shows a schematic horizontal sectional view of one exemplary embodiment of the modular storage and order picking system 100 according to the invention. The conveyor unit 30 is formed by conveyor means 32 (FIG. 4) extending on both sides along the longitudinal axis of the storage unit 10. Arranged on the end face of the storage unit 10 is the order picking unit 20, which is attached to the short side of the main frame 40. The storage unit 10, the order picking unit 20 and the conveyor unit 30 form the modules of the modular storage and order picking system according to the invention.

Figure 5:
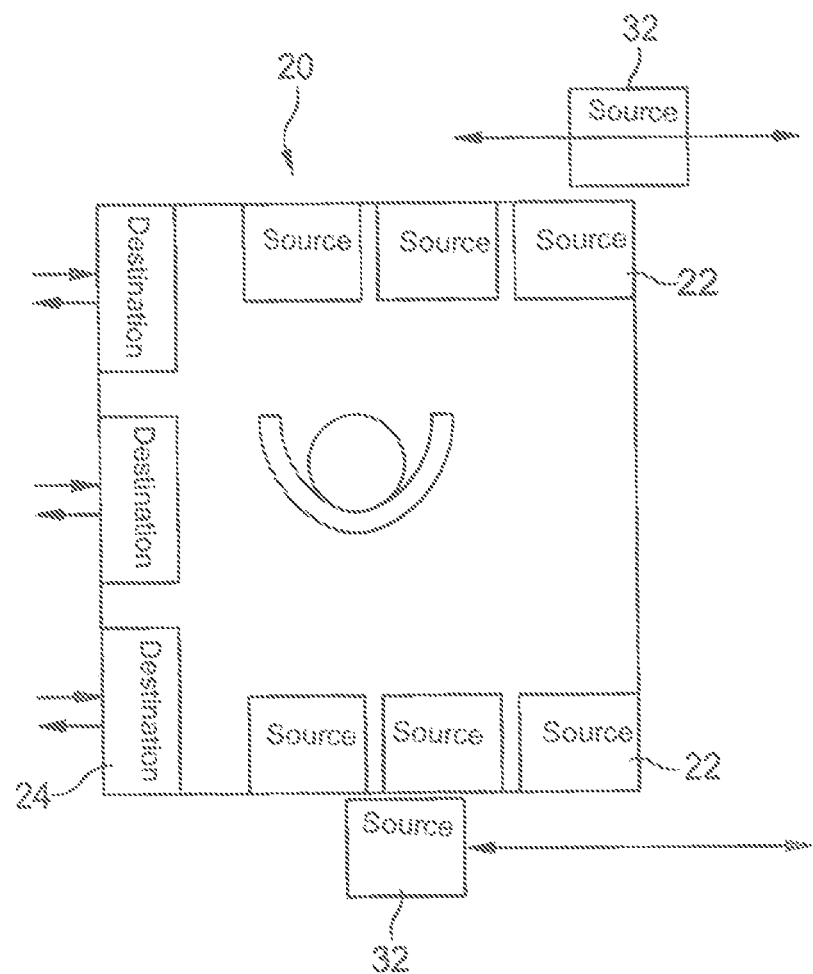
FIG. 5 shows a schematic horizontal sectional view of the order picking unit of one exemplary embodiment of the modular storage and order picking system according to the invention.

The order picking unit 20 shown schematically in FIG. 5 is functionally connected to the storage unit via the removal devices and conveyor means 32 of the conveyor unit 30, wherein the conveyor means 32 both store the containers in the through-flow channels 12 of the storage unit 10 and also retrieve them therefrom. The order picking unit 20 preferably also contains a control cabinet, the overall control system and the inventory management computer, as well as the order picking and packing space on a platform.

The mode of operation of the modular storage and order picking system according to the invention will be explained below.

A source container 14 required for an order picking process is retrieved from the storage unit 10 according to the goods-to-person principle and is made available to the order picker at one of the dispensing spaces 22 of the order picking unit 20. Via light indicators or a screen display (not shown), which are known per se, the order picker is directed to remove the required number and also the correct removal location (in the case of subdivided containers) and places the removed article(s) in a container at the specified retrieval space 24. After confirmation, the container 14 is returned to the storage unit 10 by the conveyor means 32 in a fully automated manner, but not to a defined storage space but rather to a through-flow channel 12 that is selected freely or according to algorithms. Should the requested source container 14 not be at the foremost position of the through-flow channel 12, the removal device 32 removes all the containers 14 located in front of it, one after the other and in a fully automated manner, and places them on an optional return-to-storage conveyor located in the middle of the storage unit 10, or immediately returns said containers to storage in an opposite channel that has free spaces. If the return-to-storage conveyor is used, the opposite removal device 32 feeds said containers 14 that are not required back into the same channel or into a different free channel.

It is also possible for containers that will be required again in the near future, as can be seen in the order pool, to be buffer-stored in buffer spaces (not shown) above or below the target spaces 24 of the order picking module 20.

The integrated inventory management system (not shown) controls and tracks all movements within the facility and controls the order picker. It therefore knows, at any given time, where each container is located and how much stock it contains. The connection to the customer's host may take place online or offline. By means of special algorithms in the inventory management system, it is possible to create specific free through-flow channels in which, upon rearrangement, containers that will be required in the near future can be stored in a targeted and chronologically optimized manner so as to shorten the access times at the time of need.

The modular storage and order picking system 100 according to the invention may contain further components, such as for example a separate packing table, shelves for packaging material, printers, screens, etc.

The modular storage and order picking system 100 according to the invention can be constructed, put into operation and used productively within a very short period of time, usually within a few hours after delivery. In contrast to conventional order picking facilities, no permanent anchoring in a building is required. The storage and order picking system 100 according to the invention consists of a self-supporting frame 40 and the add-on modules, which after delivery are merely connected to one another preferably by plug-in connections.

Immediately after the storage and order picking system 100 has been erected, goods can begin to be placed into storage. This takes place by taking empty containers out of storage, filling them with goods in a computer-controlled manner, and then automatically returning them to storage. As soon as sufficient goods are available (the facility need not be completely filled), the order picking mode can be started. In addition, at any subsequent point in time, the order picking mode and the refilling mode may be mixed simultaneously as required.

The modular storage and order picking system 100 according to the invention can be broken down, at any time and with little effort, into the individual modules and can be reassembled at a different site within a few hours. During this, the goods can remain in the storage unit 10, as a result of which resumption of productive operation can begin immediately at the new installation site.

Due to the modular nature, additional facilities can be added and linked into the process without physical connection. This can be used on the one hand to achieve increases in performance or capacity, but also to cushion temporary peaks. Once the peak demand is over, modules can be removed again without any break in operation. Disassembly and transfer to a different installation site is also possible within a similarly short period of time.

What is claimed is:

1. A modular storage and order picking system, comprising:
    a storage unit having a plurality of through-flow channels arranged perpendicular to the storage unit for receiving a plurality of storage containers for storing articles, wherein each through-flow channel is inclined relative to the horizontal and is configured to store multiple storage containers, one in front of the other, such that when a front-most storage container is removed from a through-flow channel, a second storage container in the through-flow channel automatically moves into the front most position,
    an order picking unit arranged on one or both end faces of the storage unit and having one or more dispensing spaces for removing articles and one or more target spaces for collating articles relating to an order or partial order,
    at least one conveyor unit arranged along the longitudinal axis of the storage unit for conveying storage containers between the storage unit and the order picking unit,
    wherein the storage unit has a self-supporting frame structure, on which the order picking unit and the conveyor unit are mounted in a manner detachably connected to one another,
wherein the self-supporting frame structure is configured to have at least one of:
    dimensions corresponding to internal dimensions of a standard 40-foot container; and
    dimensions corresponding to maximum dimensions of a semi-trailer: and
    wherein the storage unit, the order picking unit and the conveyor unit are functionally connected to one another by means of detachable mechanical and electrical plug-in connections.

2. The modular storage and order picking system according to claim 1, which is not permanently connected to the floor or to a building and wherein the self-supporting frame structure stands on the floor and the through-flow channels, the order picking unit and the conveyor unit are connected thereto.

3. The modular storage and order picking system according to claim 1, wherein the storage unit is shaped as a cuboid with the self-supporting frame structure on the outside, said self-supporting frame structure being formed by suspended flat bar.

4. The modular storage and order picking system according to claim 1, wherein the at least one conveyor unit further comprises a conveyor means configured for conveying storage containers between the storage unit and the order picking unit.

5. The modular storage and order picking system according to claim 1, wherein the through-flow channels are arranged one above the other transversely to the longitudinal direction of the storage unit.

6. The modular storage and order picking system according to claim 5, wherein the through-flow channels are arranged in groups or stacks inclined in opposite directions.

7. The modular storage and order picking system according to claim 1, wherein the conveyor unit has conveyor means extending on both sides along the longitudinal axis of the storage unit.

8. The modular storage and order picking system according to claim 7, wherein the conveyor means are held by add-on frames which can be detachably connected to the frame structure.

9. The modular storage and order picking system according to claim 7, wherein the order picking unit has buffer spaces above or below the target spaces, said buffer spaces being served by the conveyor means.

10. The modular storage and order picking system according to claim 1, wherein the order picking unit has an inventory management computer which records the position of the storage containers in the storage unit and enables direct access to individual storage containers.

11. The modular storage and order picking system according to claim 10, wherein the order picking unit has optical display means for displaying the quantity and target container of the article(s) to be picked.

12. The modular storage and order picking system according to claim 10, wherein the conveyor means are configured as rail-guided conveyor devices for storing the storage containers in the through-flow channels of the storage unit and retrieving them therefrom in an automated and computer-controlled manner.

* * * * *